United States Patent
Riccardi (10) Patent No.: US 7,623,724 B2
(45) Date of Patent: Nov. 24, 2009

(54) INTERFACE METHOD AND SYSTEM FOR MAPPING IMAGE INTENSITY

(75) Inventor: Fabio Riccardi, 3427 Ross Rd., Palo Alto, CA (US) 94306

(73) Assignee: Fabio Riccardi, Palo Alto, CA (US)

( * ) Notice: Subject to any disclaimer, the term of this patent is extended or adjusted under 35 U.S.C. 154(b) by 639 days.

(21) Appl. No.: 11/083,759

(22) Filed: Mar. 16, 2005

(65) Prior Publication Data
US 2006/0210150 A1    Sep. 21, 2006

(51) Int. Cl.
G06K 9/40    (2006.01)
(52) U.S. Cl. ....................... 382/254; 382/274
(58) Field of Classification Search .......... 382/254, 382/274, 309, 311
See application file for complete search history.

(56) References Cited

U.S. PATENT DOCUMENTS 4,754,332 A * 6/1988 Bergquist ................... 382/274
7,031,547 B2 * 4/2006 Kokemohr ................. 382/260
7,184,056 B2 * 2/2007 Brody et al. ............... 382/274

* cited by examiner

Primary Examiner—Brian Q Le
(74) Attorney, Agent, or Firm—Wiesner & Associates; Leland Wiesner (57) ABSTRACT

Provided is a computer implemented method and interface for mapping image intensities on a computing device. The processing method includes displaying an image on a display device having a range of intensities, subdividing the range of intensities from the image on the display device into a set of intensity zones, associating each intensity zone with one or more segments of a graphical diagram to be displayed on a computer device and moving a partition separating the one or more segments of the graphical diagram displayed on the computer device to change the intensity levels of the displayed image.

32 Claims, 9 Drawing Sheets

INTERFACE METHOD AND SYSTEM FOR MAPPING IMAGE INTENSITY

CROSS REFERENCE TO RELATED APPLICATIONS

This application is related to U.S. application Ser. No. 11/084,329 by Fabio Riccardi, entitled Interface Method and System for Finding Image Intensities and U.S. application Ser. No. 11/084,592 and entitled Interface Method and system for Blending Regions in an Image also by Fabio Riccardi filed on the same day herewith and both incorporated by reference in the entirety herein.

BACKGROUND

Digital photography has grown in popularity due to a rapid improvement in technology and affordability of equipment. Sensors used to take digital images have improved resolution thus allowing the capture of more details and nuances previously only available through traditional film cameras. The storage devices for these digital images have also improved and now can hold higher resolution images in the smaller spaces as required to fit in the digital cameras. Despite these and other improvements, the high demand and availability of digital photography equipment and storage devices have also driven costs down. Consequently, higher end digital cameras are available not only for professionals but also for many non-professional consumer enthusiasts or "prosumers".

Image processing software and equipment is an important part of digital photography. Software allows the photographer to visualize the images and perform various touch-up modifications to improve their aesthetic and visual qualities. Accordingly, the quality of the image processing software and equipment is as important as the quality of the digital camera used in taking the pictures.

This software is typically loaded on a computer along with the images from the camera however it is also possible that some of the image processing routines are built into the camera or image capture device itself. The more sophisticated image processing software also targets certain colorspaces for one or more printer or output devices to accommodate for the particular dyes, inks or toner intensities peculiar to the printing equipment. Together, the image processing software and equipment allow the photographer to accommodate for less than perfect photographic conditions, aberrations that may appear in the photographic subject matter or even include special effects in the final images.

Unfortunately, conventional image processing software is complex and difficult to use. The digital photographer needs a deep understanding of the mathematics and color theory to manipulate the images and their various qualities. For example, histograms representing the frequency of colors and/or grayscale intensities in an image provide a statistical view of the image but do not give the photographer insight to the image.

At best, the current image processing tools provide an indirect approach to modifying digital images. They disconnect the photographer from enhancing the images and leave them instead to manipulating complex mathematical formulas in hope of improving the image quality. Consequently, it is quite difficult to develop an intuition for digital photography with current image processing software and equipment.

SUMMARY

One aspect of the invention includes a computer implemented method for processing image intensity on a computing device. The processing method includes displaying an image on a display device having a range of intensities, subdividing the range of intensities from the image on the display device into a set of intensity zones, associating each intensity zone with one or more segments of a graphical diagram to be displayed on a computer device and moving a partition separating the one or more segments of the graphical diagram displayed on the computer device to change the intensity levels of the displayed image.

Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Aspects of the present invention include an interface for processing intensity levels in an image. The image intensities are mapped onto a graphical diagram and displayed on a computing device. For example, the graphical diagram uses a stacked bar chart with movable partitions between each rectangular portion of the bar chart to represent the intensity levels of the image. Moving the partitions between these rectangular portions facilitates rapid remapping of intensity values in the image according to the different intensity zones found in the image.

While there are many different advantages not all of which are specifically identified herein, aspects of the present invention may include one or more of the following advantages. Remapping zones of intensity values in the image allows an additional control over image composition. Intensity values grouped in the subject matter portion of the image can be enhanced while other intensity values considered to be background or less important can be subdued. Direct manipulation of intensity zones using implementations of the present invention simplifies the control of image intensity without a deep understanding of mathematics or image processing transformations.

Aspects of the present invention are also advantageous as they allow a photographer or designer to focus more on aesthetic qualities of a complete image rather than arcane manipulations of luminance or chrominance. Changes are made to intensity zones in an image as they relate to specific areas of the image. Accordingly, image processing is performed on certain areas of the image by manipulating an underlying intensity level associated with the area. This approach allows direct manipulation of image intensity as it relates to the context of certain areas of the image. A person using implementations of the present invention can bring out certain qualities of the image in a more direct manner than previously available.

Figure 1:
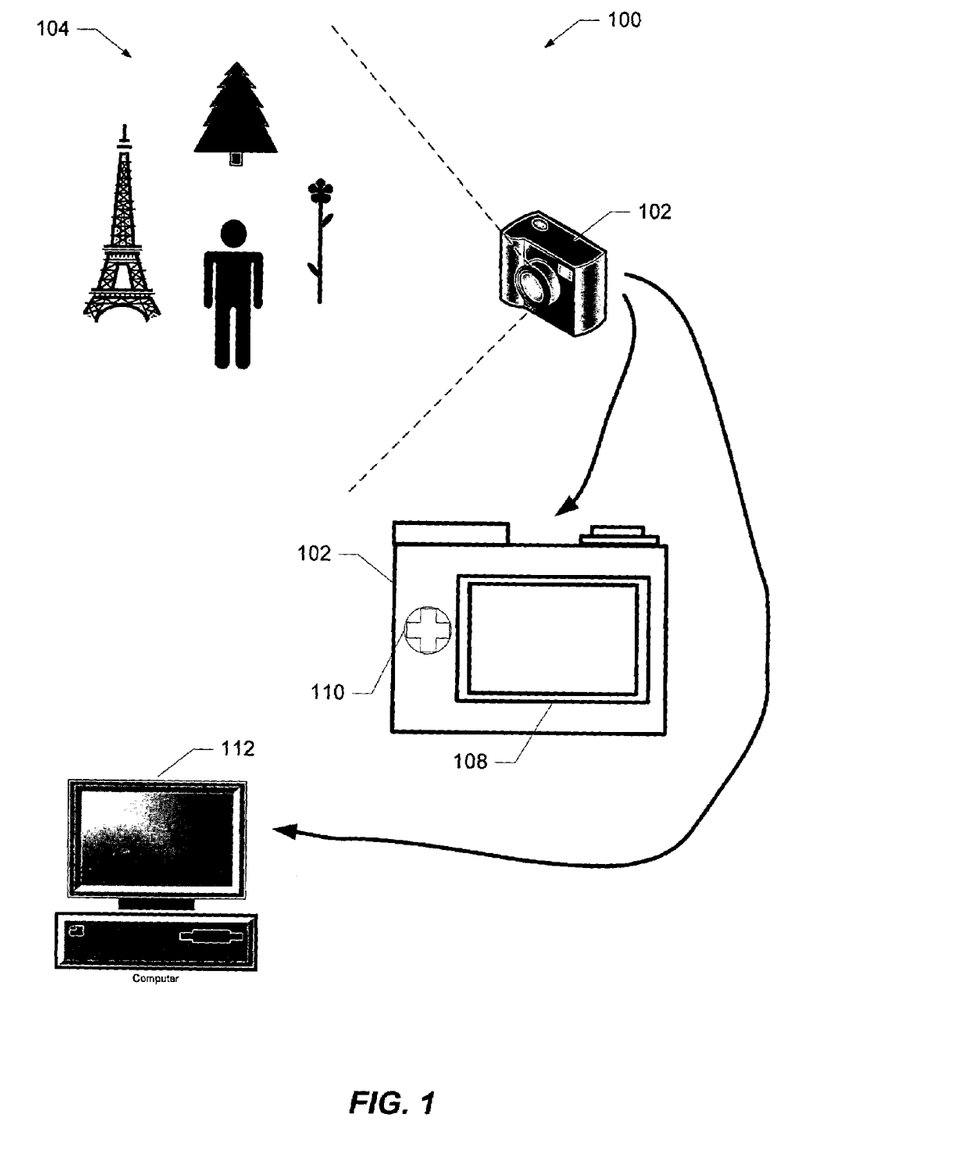
FIG. 1 depicts an image processing system that uses one or more image processing operations in accordance with implementations of the present invention for operating on zones of intensities.

FIG. 1 depicts an image processing system, hereinafter system 100, that uses one or more image processing operations and interfaces in accordance with implementations of the present invention. System 100 includes camera 102, photographic subject matter 104 and computer 112. In one implementation, image processing operations and interfaces can be implemented directly on camera 102 by way of a camera display screen 108 and menu/cursor control 110 as illustrated. Internally, camera 102 needs to have sufficient processing and storage capabilities to efficiently execute and provide image processing operations designed in accordance with the present invention. If this is not possible or desirable, an alternative solution instead transfers raw or processed digital image data to computer 112 for further processing and modification. Computer 112 can use traditional keyboard, mouse and other computer interface devices to operate the image processing software.

Figure 2:
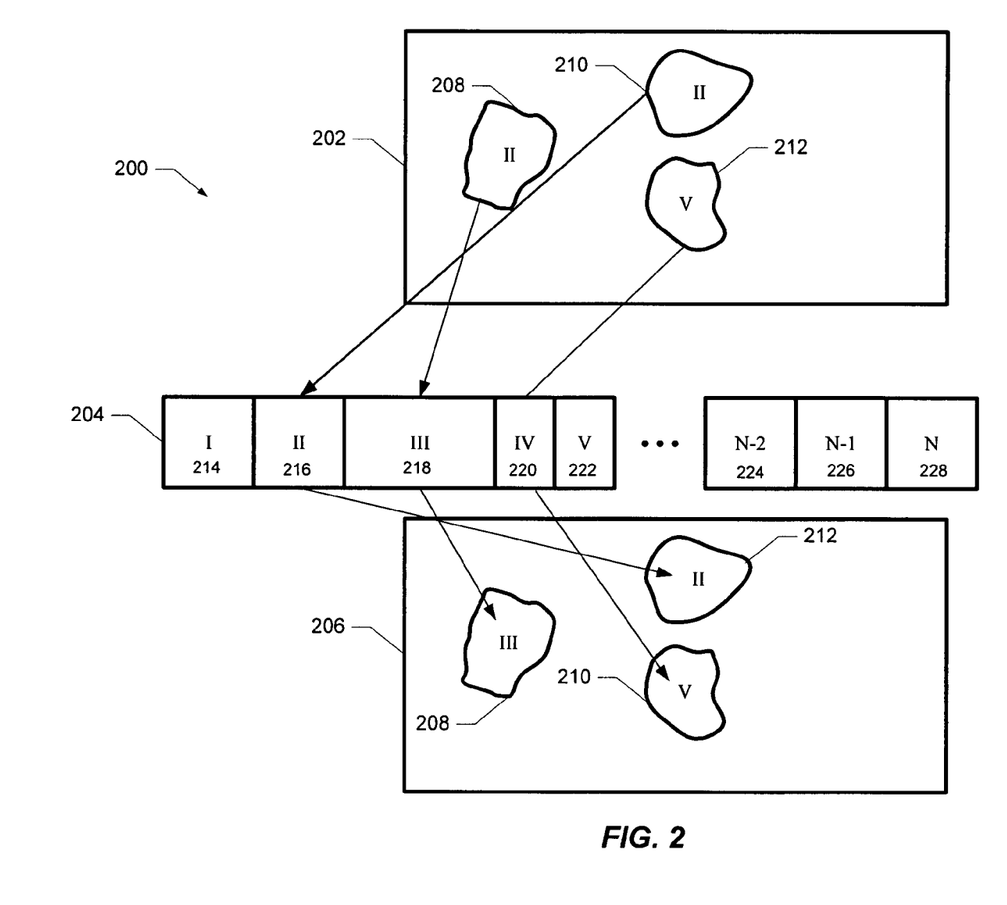
FIG. 2 is a schematic diagram of a graphical diagram interface designed in accordance with one implementation of the present invention.

FIG. 2 is a schematic diagram of a graphical diagram interface designed in accordance with one implementation of the present invention for mapping zones of intensities. As illustrated in this example, interface 200 includes an initial image 202, a graphical diagram interface 204 with segments and a modified image 206. Within initial image 202 are several intensity zones representing different portions of an image and identified as intensity zone 208, intensity zone 210 and intensity zone 212. These intensity zones associated with initial image 202 are initially marked with intensity levels "II", "II" and "V" indicating the respective intensity levels of luminance or chrominance pixels in these areas of the image. In one implementation, the intensity zones generally range from a lowest intensity of light (i.e., the darkest image portion) in intensity zone "0" to a higher intensity of light (i.e., the lightest image portion) in intensity zone "X". Each adjacent intensity zone represents a doubling of the light intensity on the image however alternate implementations might construct adjacent intensity zones using different relationships and associations. Further, eleven intensity zones ranging from intensity zone "0" to intensity zone "X" are sufficient for most images however greater or fewer intensity zones could also be used depending on the particular implementation and application. For example, a low-contrast image may only need several intensity zones while higher-contrast images may use a wider range and number of intensity zones.

To improve the aesthetic qualities of initial image 202, implementations of the present invention provides graphical diagram interface 204 to manipulate the intensity zones of the initial image 202. This interface is referred to as a zone mapper interface as it allows greater or fewer intensity levels to be mapped into or out of initial image 202. In many cases, it may be desirable to slightly increase the light intensity in one region of the image while decreasing the light intensity in another region of the image. For example, it may be desirable to increase the intensity of an important shadow area in intensity zone 212 within initial image 202 from intensity zone II up to intensity zone III. Similarly, one can subdue an element in initial image 202 by reducing the intensity of intensity zone 212 from intensity zone V down to intensity zone IV as illustrated in FIG. 2 by way of graphical diagram interface 204. In both cases, graphical diagram interface 204 is a user interface that allows a user to explore the effects of manipulating intensity levels of an image by intensity zones. Further details on the operation of graphical diagram interface 204 for mapping intensity zones in accordance with implementations of the present invention are provided later herein.

Figure 3:
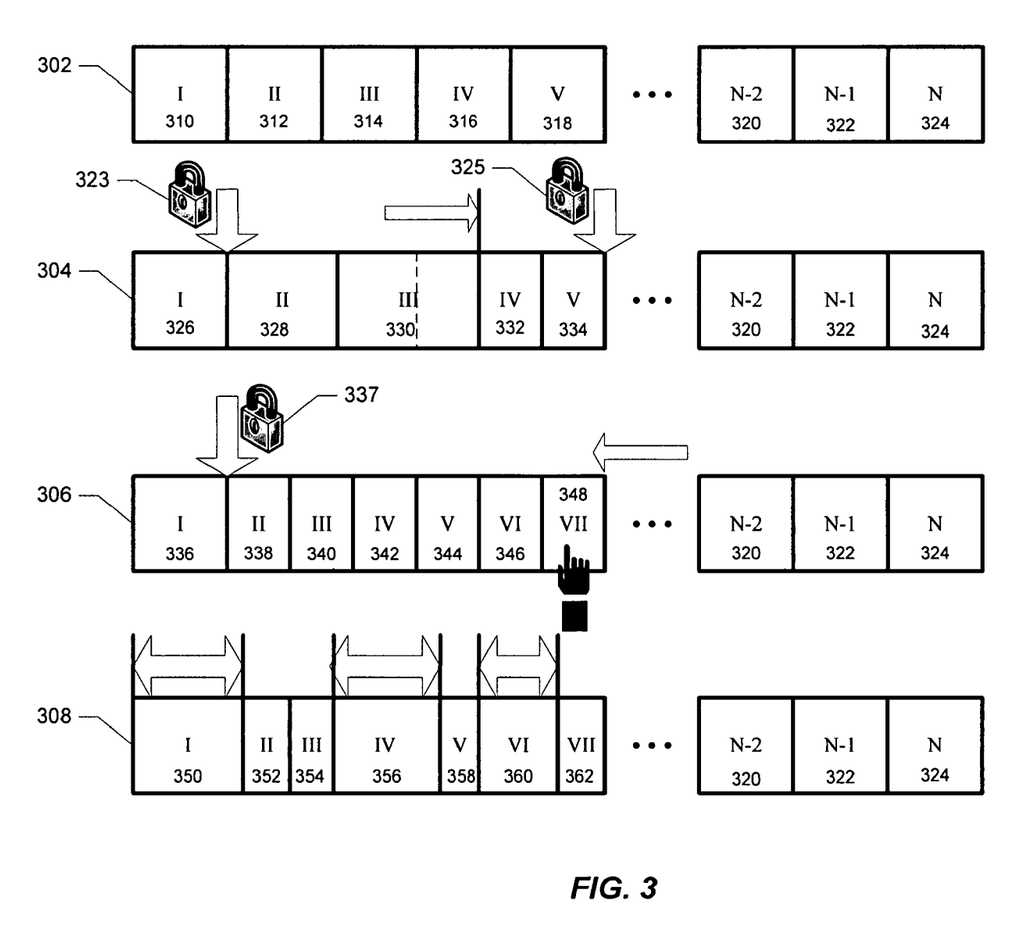
FIG. 3 depicts several different zone mapping operations performed on a user interface designed in accordance with implementations of the present invention.

FIG. 3 depicts several different zone mapping operations performed on a user interface designed in accordance with implementations of the present invention. In this example, the graphical diagram paradigm of the present invention appears as an initial stacked bar chart 302 having N rectangular segments ranging from 310, 312, 314, 316, 318 and up to 320, 322 and 324. Each rectangular segment is bounded by one or two different movable partitions that can be locked or unlocked to either restrict or accommodate changing the area of each rectangular segment. Changing the area of each segment alters the intensity values in regions of an initial image by mapping the initial intensities to different intensity values.

It should be understood that the stacked bar chart is but one graphical diagram paradigm and it is contemplated that many other graphical diagrams could also be adopted to work in conjunction with implementations of the present invention. For example, a circle rather than a stacked bar chart could also be used to represent a range of intensity levels with the different sectors of the circle corresponding to different intensity zones. Changing the arc of a sector in the circle either expands or compresses the range of intensity values to be mapped to the particular intensity zone and thereby alters the intensity levels in one or more regions of an image.

Referring once again to FIG. 3, initial stacked bar chart 302 provides an initial representation of intensity values in an initial image without any modifications. Modified stacked bar chart 304 illustrates that a first lock 323 has been placed on a partition adjacent to rectangular segment 328 and another second lock 325 adjacent to rectangular segment 334. Accordingly, expanding rectangular segment 314 (intensity zone III) in initial stacked bar chart 302 results in rectangular segment 330 (intensity zone III) having a higher upper range of intensity values and increased corresponding intensity values for regions of the image in intensity zone III. First lock 323 keeps the partition on one side of rectangular segment 328 fixed while allowing the rest of rectangular segment 328 to expand in a proportional or predetermined manner. Similarly, second lock 325 keeps the right side of rectangular segment 318 fixed as rectangular segment 314 is expanded; this results in compressing rectangular segment 316 and rectangular segment 318 into modified rectangular segment 332 and rectangular segment 334 respectively. These compressed segments reduce the range of intensities allotted for intensity zones IV and V in the image.

Modified stacked bar chart 306 illustrates yet another possible method of manipulating intensity zones in accordance with implementations of the present invention. In this example, a third lock 337 is applied adjacent to rectangular segment 338 and an additional rectangular segment 348 (intensity zone VII) is moved towards third lock 337. This causes each of rectangular segments 346, 344, 342, 340 and 338 to become compressed proportionally or a predetermined amount yet rectangular segment 336 does not change in characteristic. The effect of this latter operation moves the intensity down to a lower level over several intensity zones (i.e., intensity zones VII, VI, V, IV, III and II) in the image.

In the last of the illustrated examples, another modified stacked bar chart 308 illustrates changing the intensity zones individually in several different ways. Without any locks in place, rectangular segment 350, rectangular segment 356 and rectangular segment 360 are expanded while rectangular segment 352, rectangular segment 354, rectangular segment 358 and rectangular segment 362 are compressed. This type of operation changes the intensity levels in several zones as well as range of intensities available in the different zones as they are displayed in the resulting image. It is contemplated that many other different types of intensity zone mapping operations are possible using the graphical diagram and user interface designed in accordance with the present invention. Accordingly, the above illustrations for using the graphical diagram and interface for manipulating image intensities are only examples and should not be construed as presenting any limitations on the use and/or construction of a user interface in accordance with the present invention.

Figure 4:
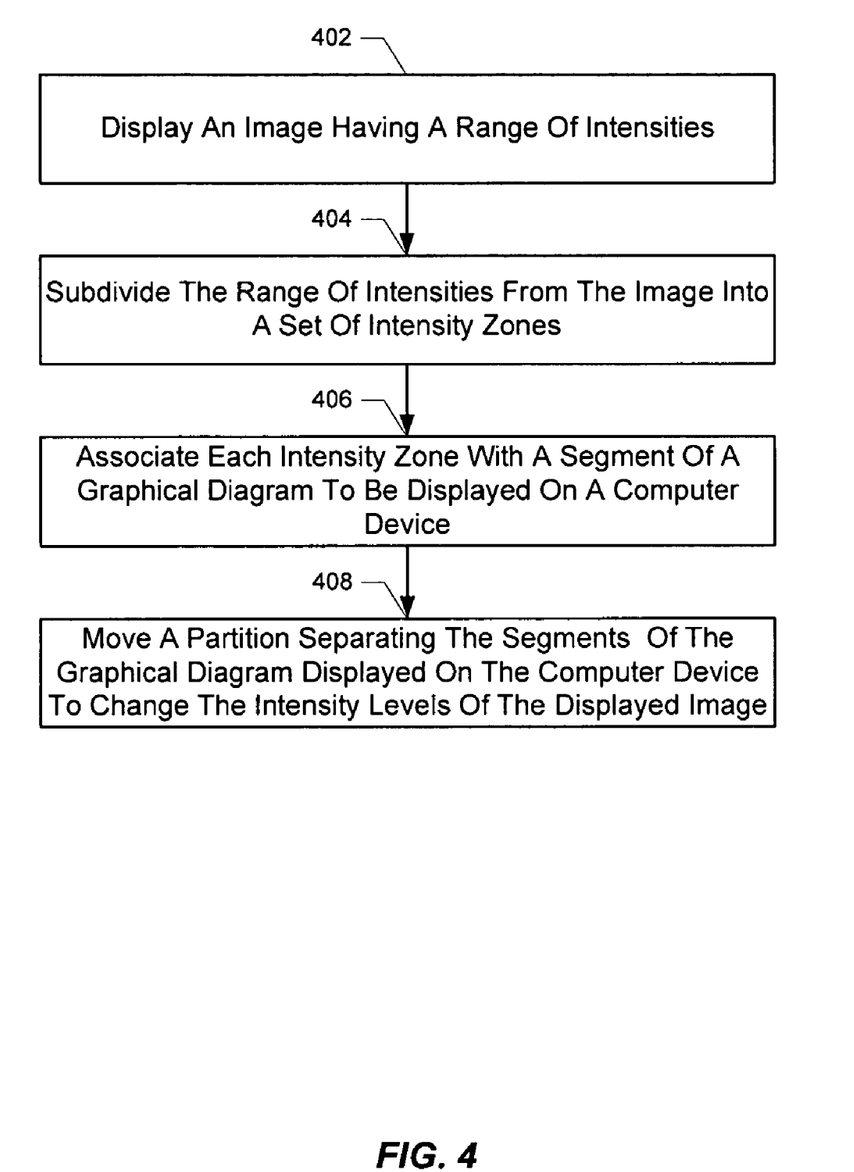
FIG. 4 provides a set of operations for using a graphical diagram to manipulate image intensities in accordance with one implementation of the present invention.

FIG. 4 provides a set of operations for using a graphical diagram to manipulate image intensities in accordance with one implementation of the present invention. Initially, the interface displays an image having a range of intensities on a display device (402). Typically, the image is processed on some type of computing device such as a camera, a personal computer, a wireless phone, a terrestrial phone or even a television or set-top box. Image intensities can be associated with luminance values from black and white images or a combination of luminance and chrominance values in a color images. Implementations of the present invention can individually modify image intensities in luminance, chrominance, red, green, blue or any other components or in any other colorspaces. Alternatively, one or more color components can also be modified together in various combinations rather than individually as dictated by the particular implementation and user operating the user interface of the present invention. The display device used to display the image includes a cathode-ray tube (CRT), a plasma screen display, a display projector, a liquid crystal display (LCD), a wireless phone display or the display from a camera device.

Next, implementations of the present invention subdivide the range of intensities from the image into a set of intensity zones (404). In one implementation, the intensities of luminance in a black and white image may range from 0 to 255 with a 0 intensity level corresponding to black and 255 corresponding to white. Depending on the complexity of the image, there may be several or many different intensity zones in the image. For example, an average black and white scenic image may have essentially 4-5 different intensity zones associated with intensity values in the range of 0 to 255.

The subdivisions used to represent the range of intensities also depend on the granularity desired when displaying the image. The numbers of divisions selected for the range of intensities can be selected in order to directly or indirectly enhance a certain level of detail in the image. Accordingly, the number of divisions selected is then used to divide the range of intensities into a set of intensity zones for the image.

To manipulate the intensities, implementations of the present invention associate each intensity zone with a segment of a graphical diagram to be displayed on a computer device (406). For example, intensity zones II, III, IV, V are assigned to different rectangular segments of a stacked bar diagram designed in accordance with implementations of the present invention. Alternatively, the intensity levels could be assigned to different sectors of a pie diagram. Instead of altering the rectangular segments, the intensity levels could be modified by changing the degrees of the angle in each sector of the pie graphical diagram.

In either the stacked bar or pie graphical diagram, moving a partition that separates the segments of the graphical diagram displayed on the computer device changes the intensity levels of the displayed image (408). In the case of the stacked bar graphical diagram, changing the partition location necessarily alters one or more rectangular portions of the stacked bar graphical diagram. This in turn also changes the intensity of certain corresponding regions in the image being displayed in the display device. Similarly, changing the sector angle in a pie graphical diagram also changes the intensity of one or more regions in the image being displayed.

In one aspect of the present invention, moving the partition increases the area of the affected segment to include an additional number of intensity levels. Increasing or expanding the intensity levels in this manner maps an additional number of intensity levels into the corresponding region of the image. For example, this expansion operation could be used to increase the intensity levels for certain intensity zones in the image as well as provide a wider dynamic range of luminance or chrominance components.

Alternatively, moving the partition may decrease the area of the affected segment in the user interface to include a fewer number of intensity levels. Accordingly, decreasing or compressing the intensity levels in this manner reduces the number of available intensity levels in the corresponding region or regions of the image. Unlike the expansion operation described previously, this compression operation would result in reducing the dynamic range of the affected region and, potentially, decreasing the intensity levels in the region or regions.

Figure 5:
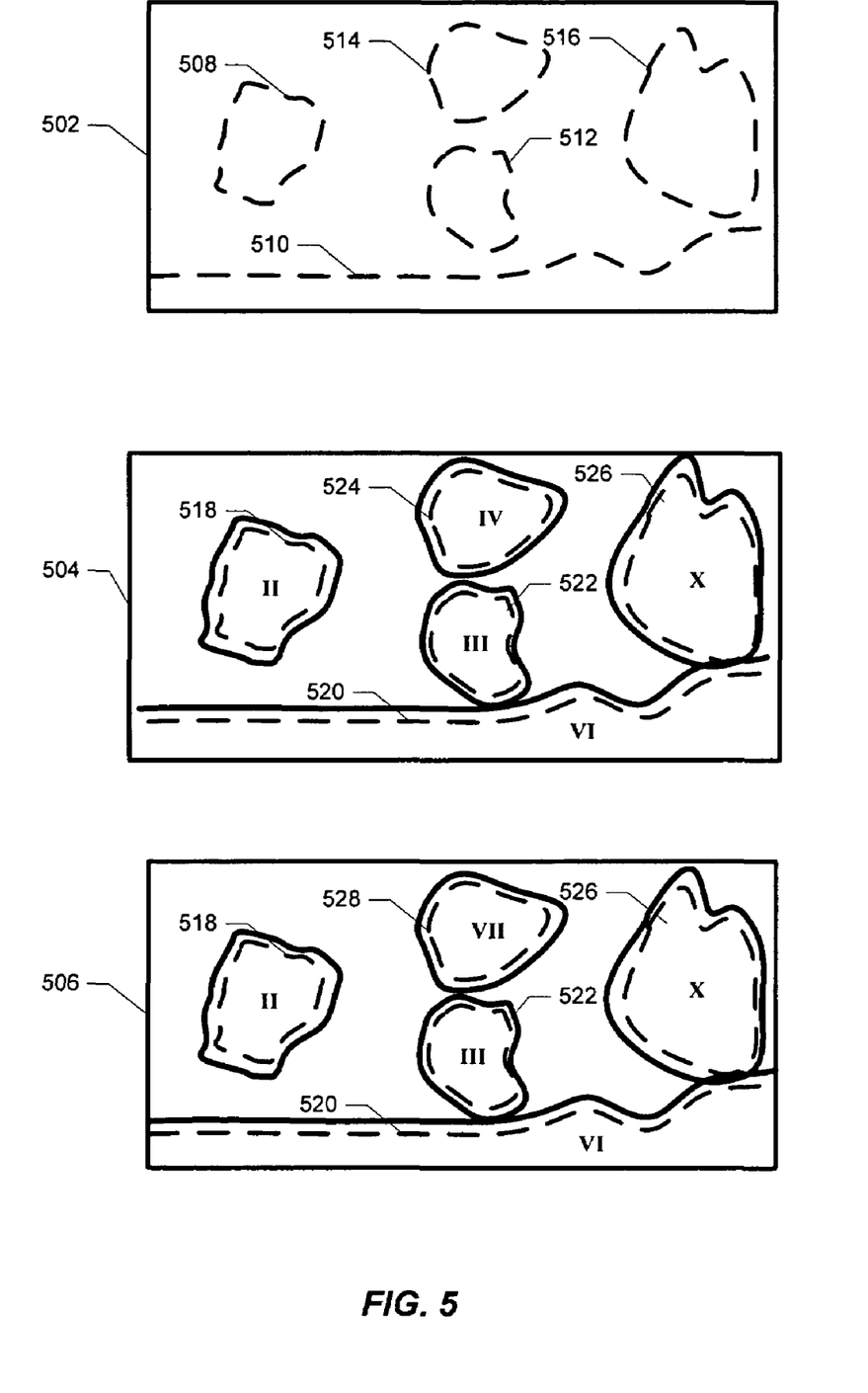
FIG. 5 is a schematic diagram of a zone finder interface designed in accordance with another aspect of the present invention.

FIG. 5 is a schematic diagram of a zone finder interface designed in accordance with another aspect of the present invention. The zone finder interface analyzes an image to be displayed and creates various intensity zones based upon the intensity levels detected in the various regions of the image. The example illustrated in FIG. 5 includes an initial image 502, a zoned image 504 and a modified zoned image 506. Initial image 502 represents an arbitrary image having various zones of intensity that naturally occur in the image but are not explicitly identified. In this example, the different zones of intensity include intensity zones 508, 510, 512, 514 and 516. Initial image 502 could be a natural scenic photo, a family portrait, a single portrait, a sports photograph or any other subject matter. The "dotted line" in FIG. 5 indicates the intensity zones in the image for discussion purposes but is not part of the actual picture.

The zone finder interface portion of the present invention processes initial image 502 and displays zoned image 504 on a display device for further analysis, investigation and processing. In this example, zoned image 504 highlights intensity zones in the image as indicated schematically by the border surrounding the dotted lines. Additionally, zoned image 504 clearly labels these zones with different intensity zone classifications. Even when used alone, the intensity information is useful and important for composition and other design purposes. By knowing intensity values for regions of an image, one can more objectively determine those areas of the image likely to standout, blend in or have other aesthetic impact.

Further, the zone finder interface can be used in conjunction with other image processing and analysis tools. For example, the zone finder interface can provide information useful with the previously described zone mapper interface of the present invention as it provides immediate feedback on the mapping of intensity values in one or more regions. For example, FIG. 5 illustrates application of the zone mapper interface to zoned image 504 resulting in modified zoned image 506. In this example, similarly numbered zones in zoned image 504 remain in the same intensity zone classification as in modified zone image 506. However, the zone mapper interface of the present invention has been used to move region 524 in zoned image 504 from intensity zone IV to intensity zone VII in region 528 of modified zone image 506.

Figure 6:
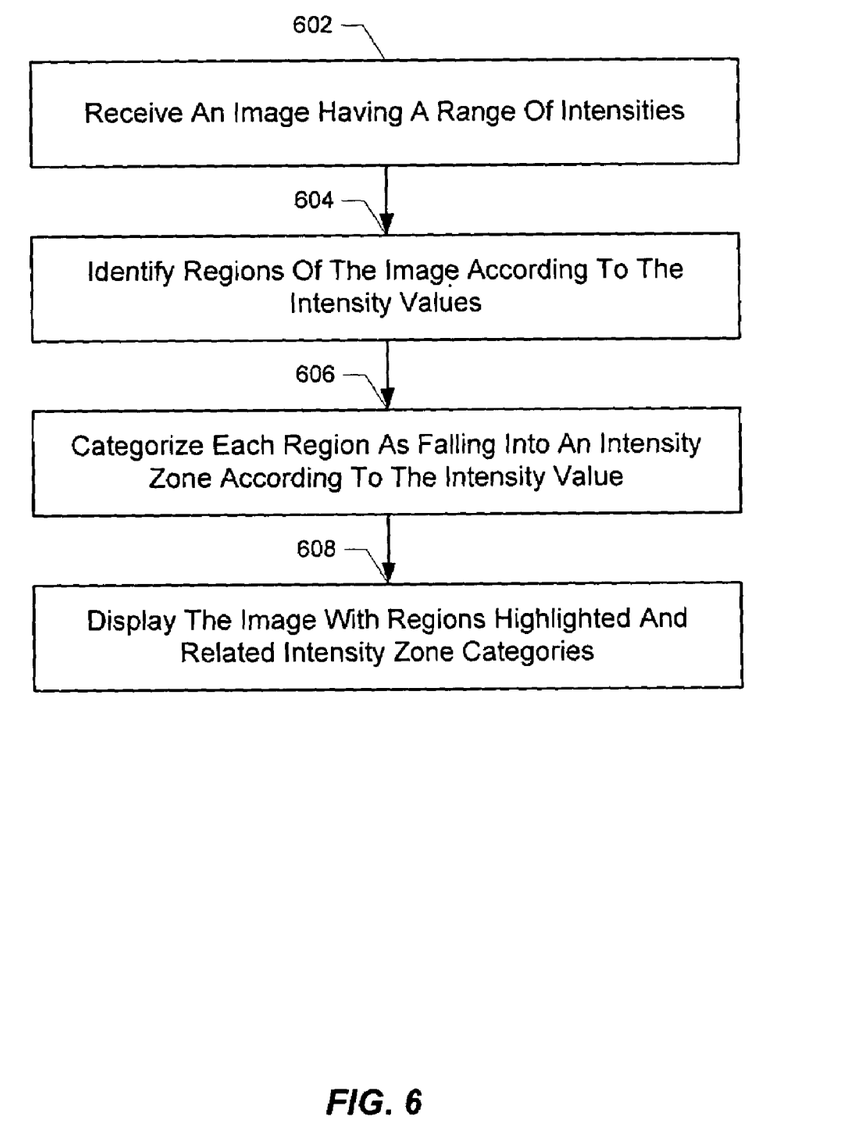
FIG. 6 is a flowchart diagram providing a set of operations performed by the zone finder interface in accordance with one implementation of the present invention.

Referring to FIG. 6, a flowchart diagram provides a set of operations performed by the zone finder interface in accordance with one implementation of the present invention. As an initial operation, the zone finder interface receives and displays an image having a range of intensities on a display for a computing device (602). As previously described with respect to the zone mapper, the image is processed on some type of computing device such as a camera, a personal computer, a wireless phone, a terrestrial phone or even a television or set-top box. Image intensities can be associated with luminance values from black and white images or a combination of luminance and chrominance values in a color images. Implementations of the present invention can individually identify image intensities in luminance, chrominance, red, green, blue or any other components or in any other colorspaces. Alternatively, one or more color components can also be identified by the zone finder together in various combinations rather than individually as dictated by the particular implementation and user operating the user interface of the present invention. The display device used to display the image includes a cathode-ray tube (CRT), a plasma screen display, a display projector, a liquid crystal display (LCD), a wireless phone display or the display from a camera device.

Next, the zone finder interface of the present invention identifies one or more regions of the image according to the intensity values in each of the one or more regions (604). In one implementation, the zone finder moves a scan area over the image to identify clusters of intensity values. For example, the scan area can be set to a larger or smaller diameter depending on the desired granularity of clusters to be identified. Next, a step function is applied to the intensity values within the clusters to transform the intensity values to one of the zone intensity categories to be displayed by the zone finder. In one implementation, this is followed by associating an intensity zone with the region based on a statistical operation using the cluster of intensity values. For example, the statistical operation or operations used to identify the zone intensity category for the region may include an average intensity value, a mean intensity value and an intensity value within a predetermined number of standard deviations. Edge detection, geometric pattern matching operations can also be applied to better identify regions.

The zone finder then categorizes each region as falling into one intensity zone from a set of intensity zones according to the intensity value for each region (606). In this implementation, the intensity zone selected for the region starts by identifying a predominant intensity value from the region. For example, the predominant intensity value may be a value that occurs in more than 50% of a given region. This predominant intensity value is compared with the intensity of one or more of the zone intensity categories to determine the closest match. Based on the comparison of intensity values, the region is assigned a particular zone intensity. The zone finder than displays the image on the display device with the regions and corresponding related intensity zones highlighted (608).

Figure 7A:
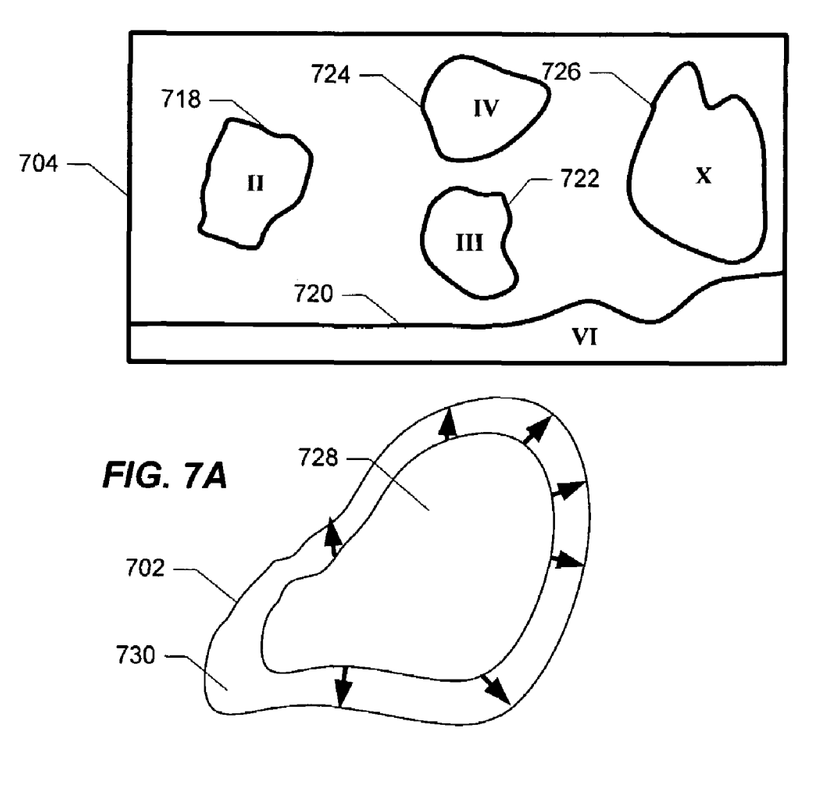
FIG. 7A depicts a region blender interface designed in accordance with one implementation of the present invention along with an initial image.

Implementations of the present invention further include a region blender interface for modifying images. In FIG. 7A a region blender interface 702 designed in accordance with one implementation of the present invention is displayed along with an initial image 704 having several regions 718, 720, 722, 724 and 726. In operation, region blender 702 is either placed over or around an area of a digital image in order to receive an image processing effect. An inner geometric shape 728 of region blender interface 702 applies a uniform or consistent degree of the image processing effect to the region that it covers. For example, placing inner geometric shape 728 over one or more regions 718, 720, 722, 724, 726 or any other area of initial image 704 causes the entire area underlying inner geometric shape 728 to become modified according to the particular image processing effect. However, the area outside of inner geometric shape 728 but within an outer geometric shape 730 receives a lesser degree of the image processing effect thus causing the modified region to blend more naturally into the surrounding area outside of region blender interface 702.

Figure 7B:
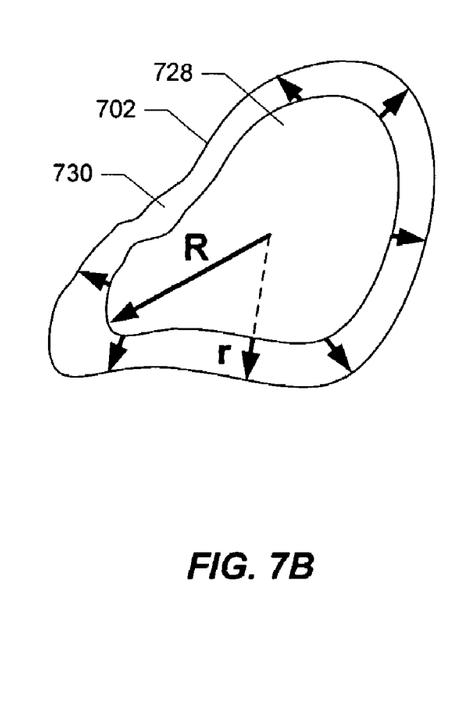
FIG. 7B illustrates a schematic of a region blender interface and parameters that govern its operation in accordance with one implementation of the present invention.

FIG. 7B illustrates a schematic of a region blender 702 and parameters that govern its operation in accordance with one implementation of the present invention. On the inner geometric shape 728 the image processing effect is applied along a radius R continuously or at the same degree or level. The longer the radius R then the greater the area of the image to receive the image processing effect. However, the image processing effect is not applied uniformly over the radius "r" and instead changes according to a monotonic schedule. For example, a function performing an image processing effect may be applied in diminishing amounts going from outside the inner geometric shape 728 to the inside of the outer geometric shape. It should also be noted the shape and size of region blender 702 can be arbitrary in shape and size and generally created to modify a region or some other particular shape in the image.

Figure 8:
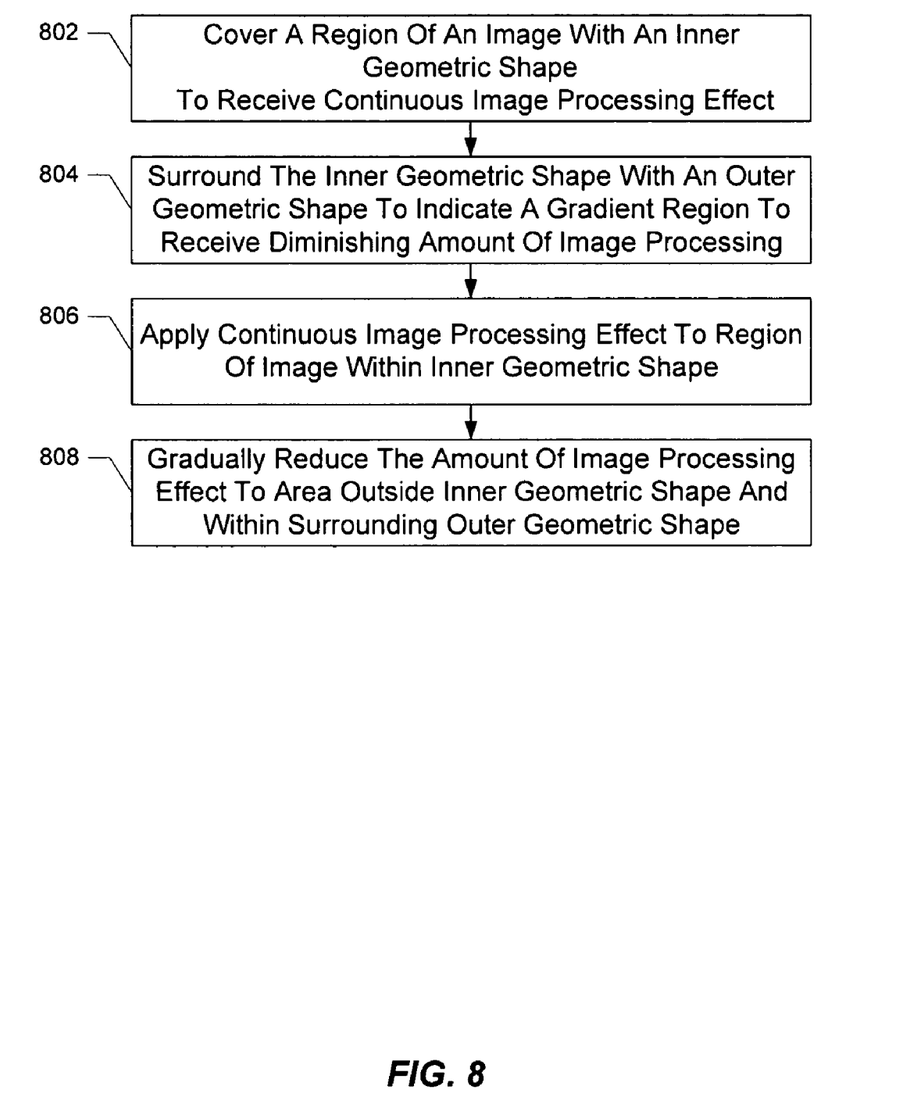
FIG. 8 is a flowchart diagram of the operations for using the region blender interface on an image having a range of intensities.

Referring to FIG. 8, the operations for using the region blender interface generally starts with covering a region of an image having a range of intensities with an inner geometric shape to receive a continuous image processing effect (802). The particular region of the image may have one or several different intensity zones and is not limited to only one intensity zone. The inner geometric shape can be a free-form shape or more traditional geometric shapes including circles, a rectangles, ellipses and triangles. As previously described, the region blender interface and image is processed on some type of computing device such as a camera, a personal computer, a wireless phone, a terrestrial phone or even a television or set-top box. Image intensities can be associated with luminance values from black and white images or a combination of luminance and chrominance values in a color images. Implementations of the present invention can individually modify image intensities in luminance, chrominance, red, green, blue or any other components or in any other colorspaces. Alternatively, one or more color components can also be modified by the region blender together in various combinations rather than individually as dictated by the particular implementation and user operating the user interface of the present invention. The display device used to display the image includes a cathode-ray tube (CRT), a plasma screen display, a display projector, a liquid crystal display (LCD), a wireless phone display or the display from a camera device.

Next, the region blender interface surrounds the inner geometric shape with an outer geometric shape to indicate a gradient region to receive a diminishing amount of the image processing effect (804). The outer geometric shape typically corresponds to the inner geometric shape but is larger in size.

A larger outer geometric shape compared to the inner geometric shape allows a more gradual decrease of the image processing effect. Conversely, the smaller the outer geometric shape compared to the inner geometric shape then the faster the decrease of the image processing effect. In general, the outer geometric shape can also be a free form shape or more traditional geometric shapes including circles, a rectangles, ellipses and triangles.

Once the region blender interface is positioned, it applies the continuous image processing effect to the region of image within inner geometric shape (806). The image processing operation may be one of many different image operations including increasing an intensity level, decreasing an intensity level, sharpening, blurring or any other effect. However, outside the inner geometric shape the continuous image processing effect is gradually reduced to the area outside inner geometric shape and within surrounding outer geometric shape (808). The region blender interface operates by blending the area not receiving the image processing into the area of the region receiving the image processing. This makes the transition between areas of the region blender and the remainder of the image more natural and convincing. Of course, the distance between the inner and outer geometric shape can be increased or decreased depending whether one wants to gradually blend the region or rapidly blend the region. Either way, a gradient region between the inner and outer geometric receives different amounts of image processing according to a monotonic progression.

Figure 9:
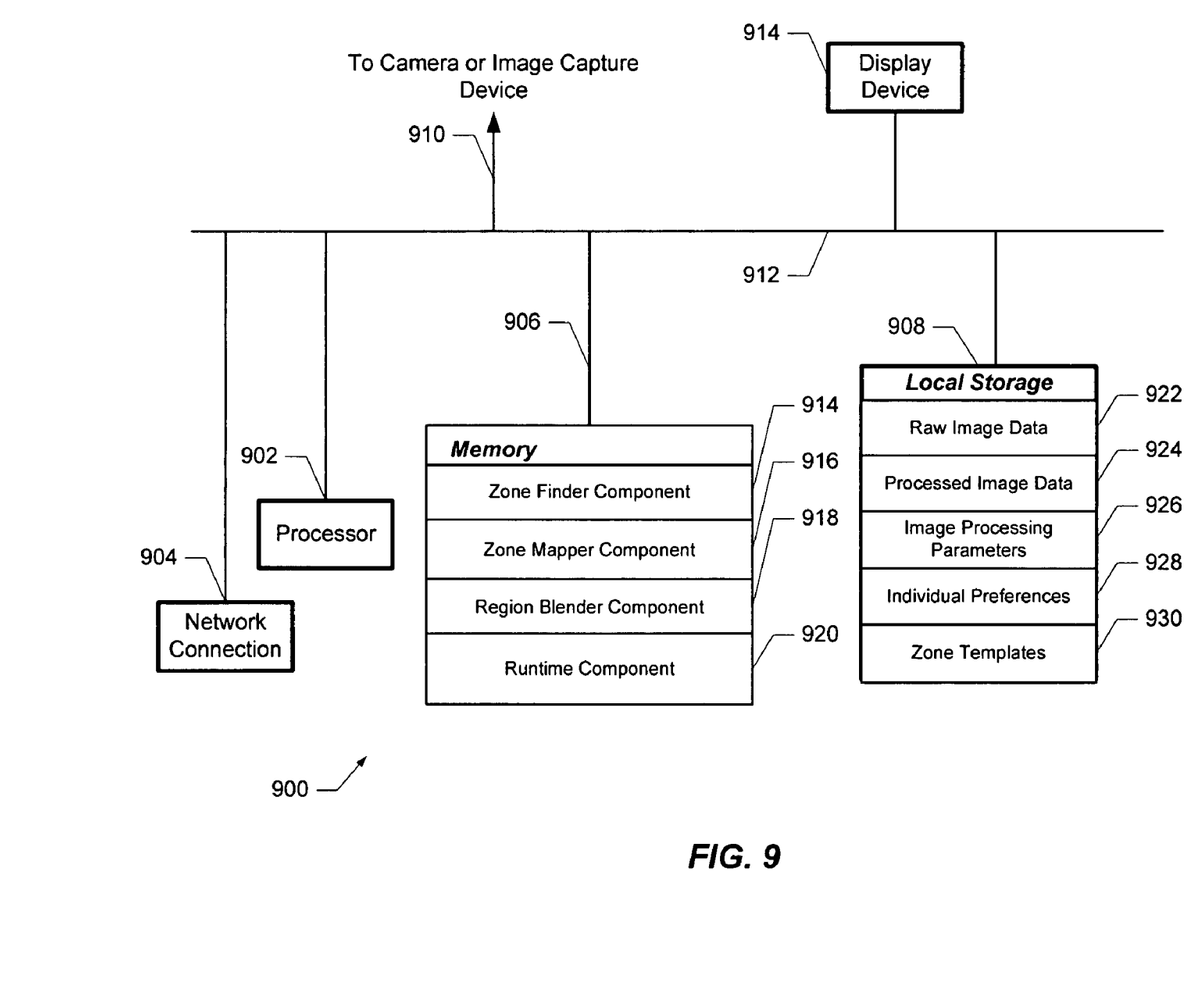
FIG. 9 depicts components of a system implementing one or more user interface components for analysis and modification of images in accordance with one implementation of the present invention.

FIG. 9 depicts components of a system implementing one or more user interface components for analysis and modification of images in accordance with one implementation of the present invention. As illustrated in this example, image processing system 900 includes a processor 902, a network connection 904, a camera/image capture interface 910, local storage 908, a display device and memory 906. Alternate implementations of the present invention may include fewer or greater number of components than that depicted in the illustration of FIG. 9. For example, a camera or image capture device may be part of system 900 and therefore processing is done directly on a camera having system 900. Alternatively, images taken with a camera or image camera device can be downloaded to system 900 through camera or image capture interface 910 and not be integral to system 900.

Processor 902 can be one or more general purpose processors arranged to process instructions in parallel or in a cluster arrangement. Alternatively, processor 902 can also include a set of special purpose embedded processors designed to work together on specific processing tasks associated with image analysis and modification as needed by implementations of the present invention. Network connection 904 provides connectivity to an intranet, the Internet, other network attached image capture sources. This network connection 904 can also be used to download updates to applications or firmware within image processing system 900.

Local storage 908 is a dataset storage area for storing image data and processing parameters in accordance with implementations of the present invention. In this example, local storage 908 includes raw image data 922, processed image data 924, image processing parameters 926, individual preferences 928 and zone templates 930. Raw image data 922 is produced when a camera or image capture device initially senses an image. While this raw image data 922 may have additional storage requirements, it is useful as it allows more flexibility in processing later on. Processed image data 924 is the data produced once raw image data 922 has been converted into another format or processed using image processing effects implemented in accordance with the present invention. For example, processed image data 924 may have smaller storage requirements and/or eliminate portions of the data set not necessary for subsequent viewing or processing. Image processing parameters 926 and individual preferences 928 hold any and all parameters used in customizing the image processing interfaces of the present invention and their particular operation. These preferences in individual preferences 928 can be changed quickly to accommodate multiple people using image processing system 900 without requiring reprogramming or retraining. Finally, in this example a number of zone templates 930 are available to assist in processing common intensity levels found in certain types of images using implementations of the present invention. For example, a set of default or customized zone templates 930 can be created to address scenic images, portrait images, high contrast or low contrast images, images taken under bright light conditions, images taken under low light conditions or other particular environmental/situational lighting conditions that occur in photography.

A number of example components used in conjunction with image processing system 900 and an interface designed in accordance with the present invention are illustrated in memory 906. These interface components include: a zone finder component 914, a zone mapper component 916, a region blender component 918 and a runtime component for managing resources on the system as one or more of these interfaces are being utilized. As previously described, each of these different interface components can be used alone or in conjunction with each other for increased ease of use and to obtain more aesthetic results in digital images.

Various aspects of present invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device.

Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Accordingly, the invention is not limited to the above-described implementations, but instead is defined by the appended claims in light of their full scope of equivalents.

What is claimed is:

1. A computer implemented method for processing image intensities on a computing device comprising:
   displaying an image on a display device having a range of intensities;
   subdividing the range of intensities from the image on the display device into a set of intensity zones;
   associating each intensity zone with one or more segments of a graphical diagram to be displayed on a computer device; and
   moving a partition separating the one or more segments of the graphical diagram displayed on the computer device to change the intensity levels of the displayed image.

2. The method of claim 1 wherein the computing device is selected from a set of computing devices including: a camera, a personal computer, a wireless phone, a terrestrial phone, a television and a set-top box.

3. The method of claim 1 wherein the range of intensities corresponds to one or more luminance values in the image.

4. The method of claim 1 wherein the range of intensities corresponds to one or more chrominance values in the image.

5. The method of claim 1 wherein the display device is selected from a set of display devices including: a cathode-ray tube (CRT), a plasma screen display, a display projector, a liquid crystal display (LCD), a wireless phone display and a camera display.

6. The method of claim 1 subdividing the range of intensities further includes:
   selecting a level of granularity for representing the range of intensities appropriate for the image;
   picking a number of divisions for the range of intensities that corresponds to the desired granularity for the image; and
   dividing the range of intensities for the image into a set of intensity zones in accordance with the number of divisions.

7. The method of claim 1 wherein the graphical diagram to be displayed is selected from a set of graphical diagrams including: a bar diagram and a pie diagram.

8. The method of claim 7 wherein each of the one or more segments from the pie diagram is a sector that varies in degrees.

9. The method of claim 7 wherein each of the one or more segments from the bar diagram appears as a rectangular portion of the bar diagram 10. The method of claim 1 wherein moving the partition further comprises:
    increasing the area of a first segment to include an additional number of intensity levels from the range of intensities in the image on the display; and
    mapping the additional number of intensity levels from the image to a different intensity level associated with the first segment.

11. The method of claim 10 further comprising:
    decreasing the area of a second segment to include fewer intensity levels from the range of intensities in the image on the display; and
    mapping the fewer intensity levels from the range of intensities in the image on the display to an intensity level associated with the second segment.

12. A computer program product tangibly embodied in a computer-readable storage device for processing image intensities on a computing device, comprising instructions operable to cause a programmable processor to:
    display an image on a display device having a range of intensities;
    subdivide the range of intensities from the image on the display device into a set of intensity zones;
    associate each intensity zone with one or more segments of a graphical diagram to be displayed on a computer device; and
    move a partition separating The one or more segments of the graphical diagram displayed on the computer device to change The intensity levels of the displayed image.

13. The computer program product of claim 12 wherein the computing device is selected from a set of computing devices including: a camera, a personal computer, a wireless phone, a terrestrial phone, a television and a set-top box.

14. The computer program product of claim 12 wherein the range of intensities corresponds to one or more luminance values in the image.

15. The computer program product of claim 12 wherein the range of intensities corresponds to one or more chrominance values in the image.

16. The computer program product of claim 12 wherein the display device is selected from a set of display devices including: a cathode-ray tube (CRT), a plasma screen display, a display projector, a liquid crystal display (LCD), a wireless phone display and a camera display.

17. The computer program product of claim 12 wherein the instructions that subdivide the range of intensities further includes instructions that:
    select a level of granularity for representing die range of intensities appropriate for die image;
    pick a number of divisions for The range of intensities that corresponds to the desired granularity for the image; and
    divide the range of intensities for the image into a set of intensity zones in accordance with the number of divisions.

18. The computer program product of claim 12 wherein the graphical diagram to be displayed is selected from a set of graphical diagrams including: a bar diagram and a pie diagram.

19. The computer program product of claim 18 wherein each of the one or more segments from the pie diagram is a sector that varies in degrees.

20. The computer program product of claim 18 wherein each of the one or more segments from the bar diagram appears as a rectangular portion of the bar diagram.

21. The computer program product of claim 12 wherein moving the partition further comprises instructions that:
    increase the area of a first segment to include an additional number of intensity levels from the range of intensities in the image on the display; and
    map the additional number of intensity levels from the image to a different intensity level associated with the first segment.

22. The computer program product of claim 21 further comprising instructions that:
    decrease the area of a second segment to include fewer intensity levels from the range of intensities in the image on the display; and
    map the fewer intensity levels from the range of intensities in the image on the display to an intensity level associated with the second segment.

23. A computing device for processing image intensities comprising:
    a processor capable of executing instructions;
    a memory containing instructions when executed on the processor display an image on a display device having a range of intensities, subdivide the range of intensities from the image on the display device into a set of intensity zones, associate each intensity zone with one or more segments of a graphical diagram to be displayed on a computer device and move a partition separating the one or more segments of the graphical diagram displayed on the computer device to change the intensity levels of the displayed image.

24. The computing device of claim 23 wherein the computing device is selected from a set of computing devices including: a camera, a personal computer, a wireless phone, a terrestrial phone, a television and a set-top box.

25. The computing device of claim 23 wherein the range of intensities corresponds to one or more luminance values in the image.

26. The computing device of claim 23 wherein the range of intensities corresponds to one or more chrominance values in the image.

27. The computing device of claim 23 wherein the display device is selected from a set of display devices including: a cathode-ray tube (CRT), a plasma screen display, a display projector, a liquid crystal display (LCD), a wireless phone display and a camera display.

28. The computing device of claim 23 wherein the graphical diagram to be displayed is selected from a set of graphical diagrams including: a bar diagram and a pie diagram.

29. The computing device of claim 28 wherein each of the one or more segments from the pie diagram is a sector that varies in degrees.

30. The computing device of claim 28 wherein each of the one or more segments from the bar diagram appears as a rectangular portion of the bar diagram.

31. The computing device of claim 23 wherein moving the partition further comprises instructions that:
   increase the area of a first segment to include an additional number of intensity levels from the range of intensities in the image on the display; and
   map the additional number of intensity levels from the image to a different intensity level associated with the first segment.

32. A computing device for processing image intensities comprising:
   means for displaying an image on a display device having a range of intensities;
   means for subdividing the range of intensities from the image on the display device into a set of intensity zones;
   means for associating each intensity zone with one or more segments of a graphical diagram to be displayed on a computer device; and
   means for moving a partition separating the one or more segments of the graphical diagram displayed on the computer device to change the intensity levels of the displayed image.

* * * * *